US012657140B2

(12) United States Patent
Chen et al.

(10) Patent No.: US 12,657,140 B2
(45) Date of Patent: *Jun. 16, 2026

(54) METHOD FOR CONTROLLING A TARGET MEMORY BY PROGRAMMABLY SELECTING AN ACTION EXECUTION CIRCUIT MODULE CORRESPONDING TO A TRIGGERED PRESET STATE

(71) Applicant: Nanjing Tenafe Electronic Technology Co., Ltd., Nanjing City (CN)

(72) Inventors: Zhikai Chen, Shanghai (CN); Meng Kun Lee, Cupertino, CA (US); Priyanka Nilay Thakore, Mountain View, CA (US)

(73) Assignee: Nanjing Tenafe Electronic Technology Co., Ltd. (CN)

( * ) Notice: Subject to any disclaimer, the term of this patent is extended or adjusted under 35 U.S.C. 154(b) by 12 days.

This patent is subject to a terminal disclaimer.

(21) Appl. No.: 18/920,372

(22) Filed: Oct. 18, 2024

(65) Prior Publication Data

US 2025/0045220 A1      Feb. 6, 2025

Related U.S. Application Data

(63) Continuation of application No. 18/373,196, filed on Sep. 26, 2023, now Pat. No. 12,153,532, which is a (Continued)

(30) Foreign Application Priority Data

Aug. 11, 2022    (CN) .......................... 202210964281.7

(51) Int. Cl.
G06F 13/16 (2006.01)
G06F 1/3203 (2019.01)
(Continued)

(52) U.S. Cl.
CPC ........ G06F 13/1689 (2013.01); G06F 1/3203 (2013.01); G06F 1/3225 (2013.01); G06F 1/3275 (2013.01); G06F 13/423 (2013.01)

(58) Field of Classification Search
CPC .... G06F 1/3203; G06F 1/3225; G06F 1/3275; G06F 13/1689; G06F 13/423
See application file for complete search history.

(56) References Cited

U.S. PATENT DOCUMENTS 9,021,172 B2    4/2015  Horsnell
9,563,552 B2 *  2/2017  Tamura ................. G06F 11/108
(Continued)

*Primary Examiner* — Eric T Oberly
(74) *Attorney, Agent, or Firm* — Van Pelt, Yi & James LLP

(57) ABSTRACT

A programmable circuit is configured, including by selecting a plurality of target events to monitor in real time. A logical combination of the target events is specified that correspond to a triggered preset state in a plurality of preset states. A corresponding action execution circuit module is associated with the triggered preset state. After the programmable circuit is configured: the plurality of target events is monitored in real time, the corresponding action execution circuit module is selected to run in the event the triggered preset state is satisfied, and an action associated with one or more of the following is executed in the event the triggered preset state is satisfied: causing the target SSD memory to enter or exit a reset state, enabling or disabling a clock, enabling or disabling isolation control, or changing a state of a power switch of the target SSD memory.

6 Claims, 3 Drawing Sheets

Related U.S. Application Data continuation of application No. 18/077,140, filed on Dec. 7, 2022, now Pat. No. 11,803,491.

(51) Int. Cl.
  *G06F 1/3225*     (2019.01)
  *G06F 1/3234*     (2019.01)
  *G06F 13/42*      (2006.01)

(56)                References Cited

U.S. PATENT DOCUMENTS

| | | | |
|---|---|---|---|
| 2008/0201500 A1 | 8/2008 | Zytaruk | |
| 2011/0167311 A1 | 7/2011 | Bailey | |
| 2012/0124560 A1 | 5/2012 | Indukuru | |
| 2014/0013020 A1 | 1/2014 | Horsnell | |
| 2014/0013187 A1 | 1/2014 | Blaunstein | |
| 2016/0246740 A1 | 8/2016 | Cha | |
| 2017/0371574 A1 | 12/2017 | Springberg | |
| 2019/0073154 A1 * | 3/2019 | Gwin | G06F 3/0679 |
| 2019/0129630 A1 | 5/2019 | Erez | |
| 2019/0213360 A1 | 7/2019 | Gao | |
| 2022/0301598 A1 | 9/2022 | Eemani | |

* cited by examiner

300

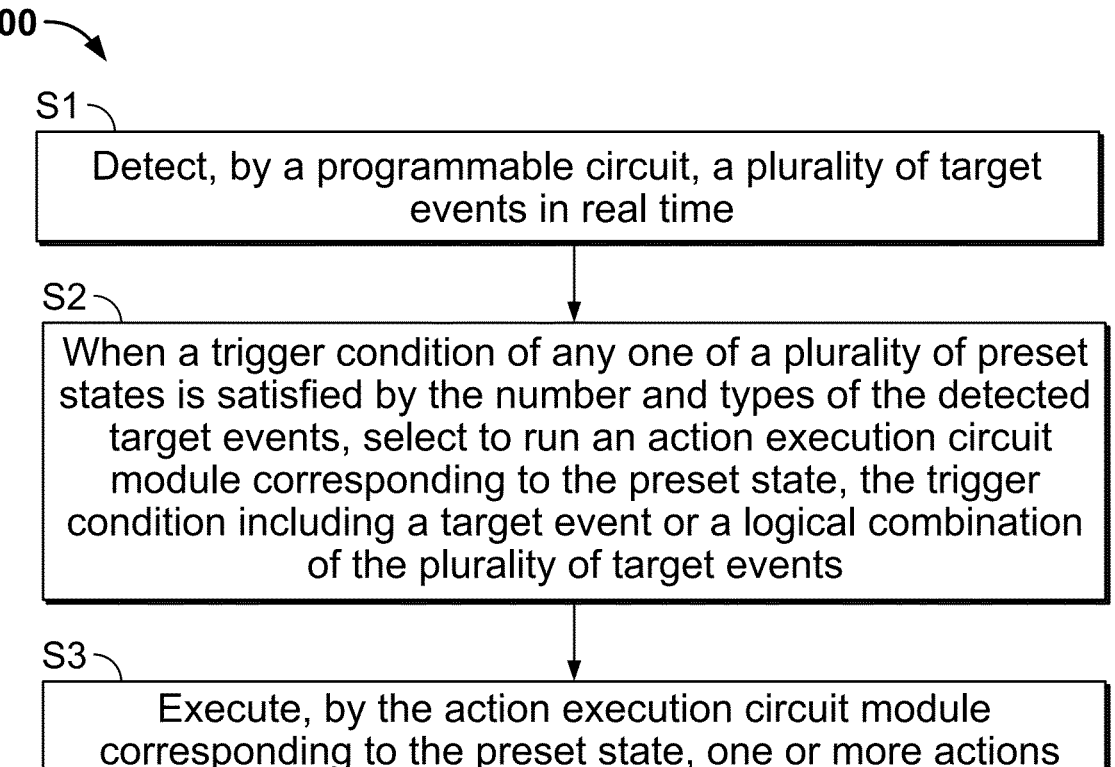

S1 —
Detect, by a programmable circuit, a plurality of target events in real time S2 —
When a trigger condition of any one of a plurality of preset states is satisfied by the number and types of the detected target events, select to run an action execution circuit module corresponding to the preset state, the trigger condition including a target event or a logical combination of the plurality of target events S3 —
Execute, by the action execution circuit module corresponding to the preset state, one or more actions corresponding to the preset state, at least one of the one or more actions being used to control a target memory

FIG. 3

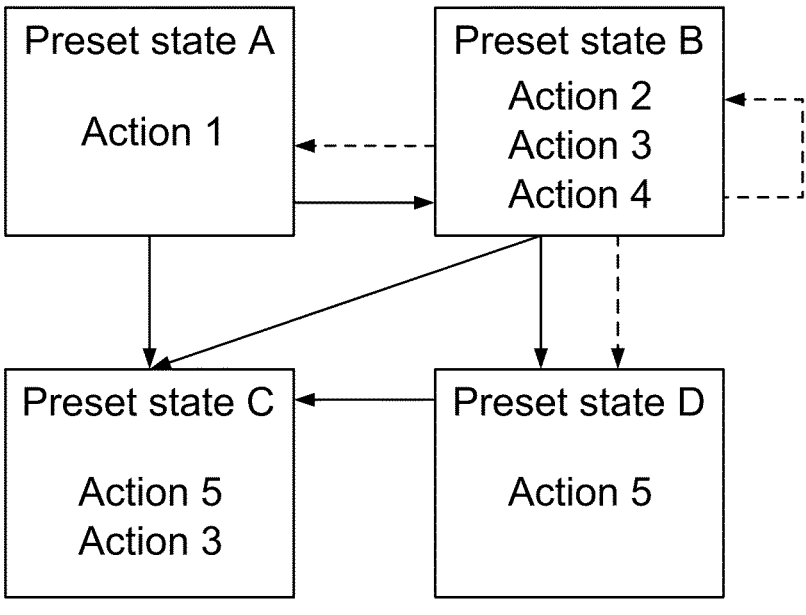

Preset state A

Action 1

Preset state B

Action 2
Action 3
Action 4

Preset state C

Action 5
Action 3

Preset state D

Action 5

FIG. 4

METHOD FOR CONTROLLING A TARGET MEMORY BY PROGRAMMABLY SELECTING AN ACTION EXECUTION CIRCUIT MODULE CORRESPONDING TO A TRIGGERED PRESET STATE

CROSS REFERENCE TO OTHER APPLICATIONS

This application is a continuation of U.S. patent application Ser. No. 18/373,196 entitled METHOD FOR CONTROLLING A TARGET MEMORY BY PROGRAMMABLY SELECTING AN ACTION EXECUTION CIRCUIT MODULE CORRESPONDING TO A TRIGGERED PRESET STATE filed Sep. 26, 2023, which is a continuation of U.S. patent application Ser. No. 18/077,140, now U.S. Pat. No. 11,803,491, entitled METHOD FOR CONTROLLING A TARGET MEMORY BY PROGRAMMABLY SELECTING AN ACTION EXECUTION CIRCUIT MODULE CORRESPONDING TO A TRIGGERED PRESET STATE filed Dec. 7, 2022, which is based upon and claims priority to People's Republic of China Patent Application No. 202210964281.7 entitled METHOD FOR CONTROLLING MEMORY, MEMORY CONTROLLER AND ELECTRONIC DEVICE filed Aug. 11, 2022, each of which is incorporated herein by reference for all purposes.

BACKGROUND OF THE INVENTION

Controllers of Solid State Drives (SSDs) are mainly controlled by host instructions to passively control the solid state drives to enter and exit a low power mode. The controllers need to be able to exit and handle asynchronous events at any time during the process of entering and exiting the low power mode. For different hosts and different buses (such as a Peripheral Component Interconnect Express (PCIe)), timings and occurred asynchronous events in the process of entering and exiting the low power mode are not exactly identical. Since the hosts need to be turned off in the process of entering and exiting the low power mode, the controllers of the SSDs become main bodies to handle the asynchronous events.

In the related art, a fixed timing for entering and exiting the low power mode is typically set for a controller of a solid state drive, which manner has a small control delay and a high control efficiency, but it is difficult to deal with asynchronous events in different hardware connection environments, and it is also difficult to adjust a strategy for entering and exiting the low power mode according to different scenes. In addition, there is a technique to integrate a small processor into a power manage unit in the controller, and edit the timing for entering and exiting the low power mode through program codes that are running in real time. However, this manner causes the delay in entering and exiting the low power mode to be large due to a long code running time, and the strategy for controlling the solid state drive to enter and exit the low power mode cannot be modified, the timing for controlling the solid state drive to enter and exit the low power mode cannot be greatly modified as well.

BRIEF DESCRIPTION OF THE DRAWINGS

Various embodiments of the invention are disclosed in the following detailed description and the accompanying drawings.

FIG. 3 is a flowchart of a method for controlling a memory according to an embodiment of the present disclosure.

FIG. 4 is a relationship diagram between a plurality of preset states according to an embodiment of the present disclosure.

DETAILED DESCRIPTION

Figure 1:
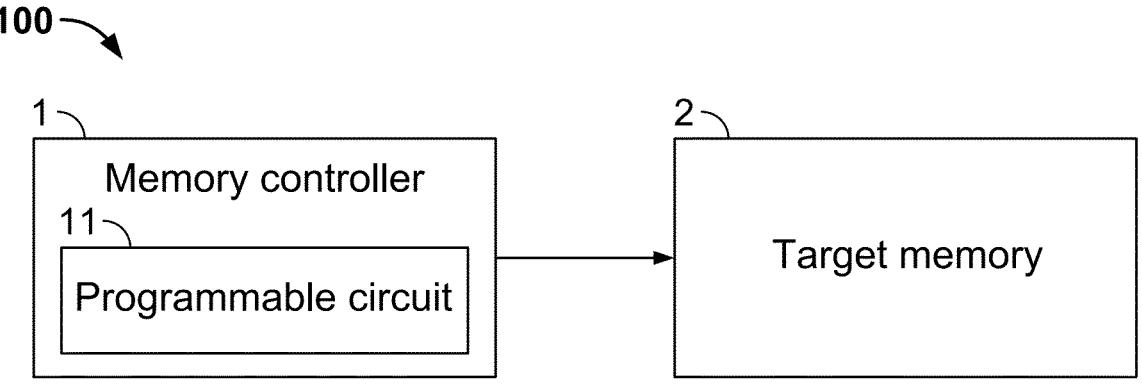
FIG. 1 is a schematic diagram of a memory controller according to an embodiment of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An objective of the present disclosure is to provide a method for controlling a memory, a memory controller and an electronic device, which are used to at least to a certain extent solve problems that a control strategy and a control timing are not flexible enough and a control delay is relatively high during a process of controlling the memory enter and exit a low power mode.

In some embodiments, there is provided a method for controlling a memory, which is implemented by a programmable circuit, the programmable circuit is configured to control a target memory, and the method for controlling the memory includes: detecting, using the programmable circuit, a plurality of target events in real time; when a trigger condition of any one of a plurality of preset states (sometimes referred to herein as a triggered preset set) is satisfied by the number and types of the detected target events, selecting to run an action execution circuit module corresponding to the (e.g., triggered) preset state, wherein the trigger condition is based on at least one of the plurality of target events (e.g., includes a target event or a logical combination of the plurality of target events); and executing, using the action execution circuit module corresponding to the preset state, one or more actions corresponding to the (e.g., triggered) preset state, wherein at least one of the one or more actions is used to control the target memory.

In an embodiment of the present disclosure, one of the one or more actions is used to control the programmable circuit to stop running the action execution circuit module corresponding to the (e.g., triggered) preset state.

In an embodiment of the present disclosure, the programmable circuit has a plurality of preset states, and there is a sequence (or ordering) between the plurality of preset states, and controlling the programmable circuit to stop running the action execution circuit module corresponding to the (e.g., triggered) preset state includes: controlling the programmable circuit to run an action execution circuit module corresponding to a previous preset state (e.g., relative to a current preset state), or controlling the programmable circuit to run an action execution circuit module corresponding to a next preset state (e.g., relative to the current preset state), or controlling the programmable circuit to re-run an action execution circuit module corresponding to the current preset state.

In an embodiment of the present disclosure, the programmable circuit has a plurality of preset states, one of the plurality of preset states is a default state, and controlling the programmable circuit to stop running the (e.g., triggered) preset state includes: controlling the programmable circuit to run an action execution circuit module corresponding to the default state.

In an embodiment of the present disclosure, one of the one or more actions is used to generate one or more of the target events.

In an embodiment of the present disclosure, one of the one or more actions is used to control a duration for which the action execution circuit module corresponding to the preset state is run by the programmable circuit.

In an embodiment of the present disclosure, the target memory is a solid state drive, and the plurality of target events include at least: a preset threshold is reached by a value of a built-in timer; the target memory is triggered to enter a low power mode; the target memory is triggered to exit the low power mode; a peripheral component interconnect express is in the preset state; a request clock of the peripheral component interconnect express is in the preset state or the peripheral component interconnect express has a preset level; and a specified input and output interface is equal to a set value.

In an embodiment of the present disclosure, the one or more actions corresponding to the preset state include at least one of the following: setting the target memory to enter or exit a reset state; enabling or disabling a clock of the target memory; enabling or disabling isolation control of the target memory; enabling a reserved trigger save function or a reserved trigger recovery function of the target memory; turning on or off an internal power switch of the target memory; and turning on or off an external power switch of the target memory.

In some embodiments, there is provided an interface to a target memory, as well as a programmable circuit that includes: a target event monitoring module, configured to monitor (e.g., detect) a plurality of target events (e.g., generating or outputting a detected number and one or more detected types); a preset state selecting module, connected to the target event monitoring module, and configured to configure trigger conditions of a plurality of preset states, and when any one of the trigger conditions is satisfied by the plurality of target events, control an action execution circuit module corresponding to the preset state to run; and a plurality of action execution circuit modules, wherein each action execution circuit module corresponds to one of the preset states, the action execution circuit module is connected to the preset state selecting module, and is configured to execute one or more actions corresponding to the preset state corresponding to the action execution circuit module, wherein at least one of the one or more actions is used to control the target memory.

According to a third aspect of at least some embodiments, there is provided an electronic device including a memory and the above-described memory controller, wherein the memory controller is configured to implement the method for controlling the memory according to any one of the above-described embodiments.

At least some embodiments of the present disclosure implement the memory controller by means of the programmable circuit. When the trigger condition of any preset state of the programmable circuit is satisfied, the preset state is run and the one or more actions corresponding to the preset state are executed to control the target memory. The control delay of controlling the target memory can be effectively reduced by means of high output efficiency of the programmable circuit, and the memory control strategy can be flexibly set by means of characteristics of the programmable circuit that the state trigger condition is programmable and the action is programmable. In addition, the double improvement of the control efficiency of the memory and the flexibility of the control strategy can be realized by setting conditions for the programmable circuit running different preset states and adjusting the timing of the control signal used to output individual actions.

FIG. 1 is a schematic diagram of a memory controller according to an embodiment of the present disclosure.

Referring to FIG. 1, a memory controller 1 is connected to a target memory 2, and the memory controller 1 includes a programmable circuit 11 configured to execute a method for controlling a memory of any of the following embodiments, so as to control the target memory 2.

In an embodiment of the present disclosure, the target memory 2 is, for example, a Solid State Drive (SSD), and the memory controller 1 is, for example, a SSD controller. In other embodiments of the present disclosure, the target memory 2 may also be another memory, such as a mechanical hard disk, a magnetic disk, a cache, a storage or the like, and in this case, the memory controller 1 may be a dedicated controller corresponding to the memory, or a Central Processing Unit (CPU), or another processor capable of setting the programmable circuit. The present disclosure is not limited by types of the target memory 2 and the memory controller 1.

In addition, the memory controller 1 can be set independently from the target memory 2 and connected with the target memory 2 through a signal line or a bus, or can be located in the same hardware package as the target memory 2.

The programmable circuit 11 may be a part of the memory controller 1, or may be a main body for implementing all functions of the memory controller 1, which can be configured by those skilled in the art according to actual needs by themselves. In an embodiment, the programmable circuit 11 may be configured to implement a function of a Power Manage Unit (PMU) in the memory controller 1.

The programmable circuit can be implemented by a variety of circuits, and can be implemented by using a variety of digital circuits and analog circuits according to specific functions that are run in the programmable circuit and specific control objectives. A specific circuit for the programmable circuit is not limited by the embodiments of the present disclosure. However, no matter what specific circuit is used to implement the programmable circuit, the specific circuit needs to have logic modules shown in FIG. 2.

Figure 2:
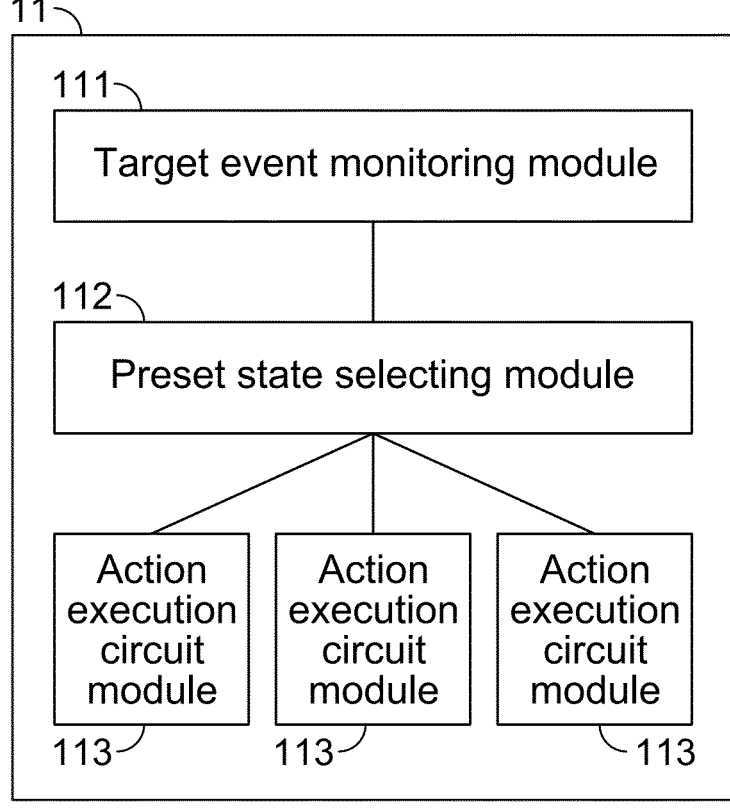
FIG. 2 is a schematic diagram of a logic function of a programmable circuit 11 according to an embodiment of the present disclosure.

FIG. 2 is a schematic diagram of a logic function of a programmable circuit 11 according to an embodiment of the present disclosure.

Referring to FIG. 2, in an embodiment, the programmable circuit 11 may include: a target event monitoring module 111, configured to monitor a plurality of target events, and the plurality of target events are all configurable events; a preset state selecting module 112, connected to the target event monitoring module 111, and configured with trigger conditions of a plurality of preset states, and configured to, when any one of the trigger conditions is satisfied by the plurality of target events, control an action execution circuit module corresponding to the preset state to run; and a plurality of action execution circuit modules 113, each action execution circuit module 113 corresponding to one preset state, the action execution circuit module 113 is connected to the preset state selecting module 112, and is configured to execute one or more actions corresponding to the preset state corresponding to the action execution circuit module 113, and at least one of the one or more actions is used to control the target memory 2.

In the embodiment shown in FIG. 2, the target event monitoring module 111 may, for example, preset a plurality of circuits corresponding to the target events that can be monitored. Before the programmable circuit 11 is run, a circuit corresponding to a target event to be monitored can be set by a program. For example, a circuit corresponding to a certain target event can be enabled or disabled by inputting enable signals or disable signals to different circuits. Taking a specific circuit as an example, if a circuit corresponding to a high-level input event of a signal INX is a NAND gate, a first input terminal of the NAND gate is configured to connect with the signal INX, a second input terminal of the NAND gate is configured to connect with the enable signal, and an output terminal of the NAND gate is configured to output a monitoring result of the high-level input event, the NAND gate can be enabled or disabled by setting a regular enable signal or disable signal for the second input terminal of the NAND gate in advance, so as to select whether to monitor the high-level input event of the signal INX.

The above circuit is only an example. According to different types of target events that the programmable circuit 11 can monitor, the target event monitoring module 111 may include different forms of configurable monitoring circuits, which are not particularly limited by the present disclosure.

The preset state selecting module 112 can also be implemented by a configurable digital circuit or analog circuit. When the preset state selecting module 112 is configured, a trigger condition corresponding to each preset state can be specifically configured, and when any trigger condition is satisfied, the action execution module 113 corresponding to the preset state is controlled to run. For example, output terminals of the monitoring circuits of the plurality of target events (these target events correspond to the same trigger condition) can be connected to an input terminal of a logic gate circuit, and the running of the action execution module 113 corresponding to the preset state is controlled according to an output signal of the logic gate circuit. In this case, the logic gate circuit is a sub-circuit in the preset state selecting module 112. The preset state selecting module 112 may have a plurality of sub-circuits to output control signals for controlling the plurality of action execution modules 113. In an embodiment, the preset state selecting module 112 can also be implemented by an integral circuit, and those skilled in the art can set it by themselves according to specific application scenarios.

It should be noted that no matter what circuit is used to implement the preset state selecting module 112, the number and types of preset states corresponding to the preset state selecting module 112 are configurable, and the trigger condition of each preset state is also configurable (for example, the input signal of the logic gate circuit in the above example needs to be configurable).

Each action execution module 113 may include sub-circuits configured to execute the one or more actions, actions executed by these sub-circuits are all configurable, and both the number and types of sub-circuits corresponding to each action execution module 113 are also configurable. In an embodiment, the sub-circuits corresponding to different action execution modules 113 may be shared. For example, an OR gate circuit may be connected to output terminals of a plurality of sub-circuits, the plurality of sub-circuits may belong to different action execution modules, and when any sub-circuit outputs a high level, the OR gate circuit can be used as the next sub-circuit of the sub-circuit in the action execution module 113 where the sub-circuit is located to run and output the high level.

The above circuit is only an example, and there can be various specific circuit configurations.

The configuration of the programmable circuit 11 may be performed before the application of the programmable circuit 11. When a brand-new unedited memory controller 1 is applied to a new device, each module in the programmable circuit 11 can be configured according to a hardware environment (PCIE parameters, CPU parameters, etc.) and application requirements of the memory controller 1, and the target event to be monitored is configured, the trigger condition for each preset state is configured, the action executed by the action execution module 113 corresponding to each preset state is configured, and so on. The configuration process can be one-time, for example, through fuse burning, or the configuration process can be erasable, for example, through code burning. However, no matter how the configuration is performed, the programmable circuit 11 after the completion configuration has a definite state and can run automatically according to transmission of an electrical signal until the configuration is modified.

By using the programmable circuit 11 to execute the method for controlling the memory of the embodiments of the present disclosure, the control logic for the memory can be flexibly adjusted, and the control delay of the memory can be shortened by means of the efficient processing of the hardware circuit.

FIG. 3 is a flowchart of a method for controlling a memory according to an embodiment of the present disclosure.

With reference to FIG. 3, a method 300 for controlling a memory may include: in step S1, a programmable circuit (e.g., that is configured to control a target memory) detects a plurality of target events (e.g., including the number of target events and types of target events) in real time; in step S2, when (i.e., in the event) the number and types of the detected target events satisfy a trigger condition (e.g., that is associated a triggered preset state) of any one of a plurality of preset states, an action execution circuit module corresponding to the (e.g., triggered) preset state is selected to run, and the trigger condition includes a target event or a logical combination of the plurality of target events (i.e., the trigger condition is based on at least one of the plurality of target events); and in step S3, the action execution circuit module corresponding to the (e.g., triggered) preset state executes one or more actions corresponding to the (e.g., triggered) preset state, and at least one of the one or more actions is used to control the target memory.

The embodiments of the present disclosure implement the memory controller by means of the programmable circuit. When the trigger condition of any preset state of the programmable circuit is satisfied, the preset state is run and the one or more actions corresponding to the preset state are executed to control the target memory. The control delay of controlling the target memory can be effectively reduced by means of high output efficiency of the programmable circuit, and the control strategy for the memory can be flexibly set by means of characteristics of the programmable circuit that the state trigger condition is programmable and the action is programmable. In addition, the timing of the control signals for outputting individual actions can be adjusted by setting conditions for the programmable circuit running different preset states to achieve the double improvement of the control efficiency of the memory and the flexibility of the control strategy.

Hereinafter, each step of the method 200 for controlling the memory will be described in detail.

In the step S1, the programmable circuit detects the plurality of target events in real time.

In the embodiments of the present disclosure, the target event is, for example, that a certain parameter of the target memory 2 or the memory controller 1 is at a certain preset value, or a value of a certain parameter changes, or an event that an indication value changes (such as a rising edge of a clock signal appears), or other events related to the running of the target memory 2 or the memory controller 1 that can be detected.

The detection of the plurality of target events is independent. For example, if a parameter has only two values of 0 and 1, the parameter being equal to 0 can be used as a target event 1, and the parameter being equal to 1 can be used as a target event 2. When the parameter is detected, it is first detected whether the value of the parameter matches the target event 1, and then detected whether the value of the parameter matches the target event 2. If the value of the parameter is equal to 0, the target event 1 is detected and the target event 2 is not detected, and if the value of the parameter is equal to 1, the target event 2 is detected and the target event 1 is not detected, and so on.

The detection results of the plurality of set target events can be latched by a latch.

In an embodiment of the present disclosure, the target memory 2 is a Solid State Drive (SSD), and the method 200 for controlling the memory is mainly used to control the target memory 2 to enter and exit a low power mode. In this case, the plurality of target events may at least include a value of a built-in timer reaches a preset threshold, the target memory is triggered to enter the low power mode, the target memory is triggered to exit the low power mode, a peripheral component interconnect express is in a preset state, a request clock of the peripheral component interconnect express is in a preset state or the peripheral component interconnect express has a preset level, and a specified input and output interface is equal to a set value.

For example, the plurality of target events can be respectively set as:

(1) the built-in timer reaches a set threshold;
(2) a Timeout event in the low power mode;

(3) a firmware is triggered to enter the low power mode;
(4) the firmware is triggered to exit the low power mode;
(5) the Peripheral Component Interconnect Express (PCIe) is in a L1.2 idle state;
(6) the PCIe is in a L1.2 exiting state;
(7) PCIe SLEEP Domain is in a power-on state;
(8) PCIe SLEEP Domain is in a power-off state;
(9) a rising edge and a high-level event of a request clock (clkreq) appear on the PCIe, or a programmable delayed rising edge and high-level event of the request clock (clkreq) generated based on the rising edge and the high level of the original request clock (clkreq) appear on the PCIe;
(10) a falling edge and a low-level event of a request clock (clkreq) appear on the PCIe, or a programmable delayed falling edge and low-level event of the request clock (clkreq) generated based on the falling edge and the low level of the original clkreq appear on the PCIe;
(11) an event that a specified General Purpose Input/Output (GPIO)=0;
(12) an event that the specified GPIO=1;
(13) an event that PCIe Perstn (a reset instruction to a PCIe device by Host)=0; and
(14) an event that PCIe Perstn=1.

The target event to be detected in the embodiments of the present disclosure can be set according to actual needs, which is not specially limited by the present disclosure.

In the step S2, when the number and types of the detected target events satisfy the trigger condition of any one of the plurality of preset states, the action execution circuit module corresponding to the preset state is selected to run, and the trigger condition includes the target event or the logical combination of the plurality of target events In the embodiments of the present disclosure, the programmable circuit 11 may have the plurality of preset states, and each preset state may be provided with the trigger condition, the trigger condition is one of the plurality of target events in the step S1, or the logical combination of the plurality of target events. For example, if the programmable circuit has four preset states of A, B, C and D, and serial numbers of the plurality of target events are 1 to 10, respectively, a trigger condition of the preset state A can be that the target event 2 occurs, a trigger condition of the preset state B can be that both the target event 1 and a target event 3 occur, and the logical combination is expressed as (target event 1 AND target event 3), a trigger condition of the preset state C can be a logical combination of three preset events 5, 6, and 7, which is expressed as (target event 5 AND (target event 6 OR target event 7)), and so on. The logic combination as the trigger condition can be implemented by setting one or more logic gate circuits, and a connection relationship between the logic gate circuits is configurable.

In some embodiments, the trigger condition may not be set for a certain preset state or certain preset states. For example, the preset state D may be set to have no trigger condition, but an action for jumping to the preset state D is set in both the preset state A and the preset state B, and the preset state D is jumped to from other preset states. In this case, the running of an action execution circuit module corresponding to the preset state D is controlled by output signals of other action execution circuit modules.

In some other embodiments, one of the plurality of preset states may also be set as a default state, and the step S1 may be set to be performed in the default state.

The setting of the preset state when the programmable circuit 11 is applied to the memory controller 1 can be adjusted according to a control requirement of the programmable circuit 11, which is not particularly limited by the present disclosure.

When the target event detected by the target event monitoring module 111 of the programmable circuit 11 satisfies a trigger condition for a certain preset state, the programmable circuit 11 runs the action execution circuit module 113 corresponding to the preset state. It should be noted that the programmable circuit 11 can only run the action execution circuit module 113 corresponding to one preset state at the same time, and accordingly, the trigger conditions of individual preset state need to be set to be independent of each other, that is, to ensure that there is no target event state that simultaneously complies with trigger conditions of two preset states.

It should also be noted that the "preset state" in the embodiments of the present disclosure refers to a state corresponding to the programmable circuit 11, rather than a standard state (e.g., a low power state) of the target memory 2. The actions corresponding to one or more preset states can control the target memory 2 to enter individual standard states, and the preset states and the actions corresponding to the preset states are configured according to the control strategy and can be flexibly modified.

In the step S3, the action execution circuit module corresponding to the preset state executes the one or more actions corresponding to the preset state, and the at least one of the one or more actions is used to control the target memory.

Each preset state may correspond to the one or more actions, and each action is, for example, calling an executable instruction or a separate action of assigning a value to a certain parameter. The number and types of actions corresponding to different preset states are different. The one or more actions may be executed by the action execution circuit module 113 corresponding to the preset state.

The time for running the preset state is fixed, but the time for completing the execution of one action is uncertain within the preset state. If a plurality of actions are set to be executed sequentially or in parallel within in one preset state, it cannot be guaranteed that a time for starting to execute each action is an ideal time, that is, the timing of other actions other than a first action within the preset state cannot be accurately controlled. Therefore, when one preset state corresponds to the plurality of actions, except for the first action, timing requirements of other actions cannot be high.

In an embodiment of the present disclosure, each preset state can be set to correspond to only one action, and then, by adjusting the trigger condition of the preset state corresponding to each action, a sequence of respective actions can be adjusted, and the timing between each action and other actions can be precisely controlled.

In an embodiment, the action corresponding to the preset state may further include an action for controlling a duration of the programmable circuit being in the preset state. By controlling the duration for which the programmable circuit 11 is in the current preset state, an execution duration of the action corresponding to the current preset state can be controlled. For example, if a first action of the preset state A is to set a certain parameter x=1, and a second action of the preset state A is to set a timer=10 s, it means that in the current preset state, x=1 is set and lasts for 10 s, and then the action execution circuit modules corresponding to other preset states can be run.

Therefore, the duration of the action corresponding to the preset state is accurately controlled, and the control timing for the target memory 2 is accurately controlled.

In another embodiment, the action corresponding to the preset state may further include an action for generating one or more target events. For example, in the above embodiment, when the target event includes the specified GPIO=1, one of the actions corresponding to a certain preset state can be set to control GPIO=1, so that after the operation of the current preset state is ended, the programmable circuit 11 can detect the occurrence of the event and determine the action execution circuit module corresponding to the next preset state to be executed.

Among the plurality of actions corresponding to the preset state, there can be either an action used to control the target memory 2 or an action used to control the programmable circuit 11 to switch (i.e., jump out the current preset state) between the action execution circuit modules corresponding to the plurality of preset states.

In an embodiment, one of the one or more actions is used to control the programmable circuit to stop running the action execution circuit module corresponding to the preset state.

FIG. 4 is a relationship diagram between a plurality of preset states according to an embodiment of the present disclosure.

Referring to FIG. 4, when the programmable circuit 11 has the plurality of preset states, the plurality of preset states may have a sequence, that is, each preset state may have a fixed next preset state or previous preset state. In some cases, one preset state may have both the fixed next preset state and the fixed previous preset state.

There may be a plurality of previous preset states of the preset state, which can be jumped to according to different conditions, and there may also be a plurality of next preset states of the preset state, which can also be jumped to according to different conditions.

In the embodiment shown in FIG. 4, the preset state A has two fixed next preset states, that is, the preset state B and the preset state C, the preset state B has one fixed previous preset state (the preset state A) and two fixed next preset states (the preset state C and the preset state D), the preset state D has one fixed previous preset state (the preset state B) and one fixed next preset state (the preset state C), and the preset state C has three fixed previous preset states (the preset state A, the preset state B and the preset state D).

The preset state A has only one action (action 1), the preset state B has three actions (action 2, action 3 and action 4 in an execution order), the preset state C has two actions (action 5 and the action 3 in the execution order), and the preset state D has one action (the action 5).

In the embodiment shown in FIG. 4, actions corresponding to different preset states may be the same, for example, both the preset state B and the preset state C have the action 3.

Stop running the action execution circuit module corresponding to the preset state also means re-running the action execution circuit module corresponding to the preset state, in addition to meaning running the action execution circuit modules corresponding to other preset states. For example, in the preset state B, when the execution of the action 2 is completed, the action 3 can be set after the action 2 to determine whether the action execution circuit module corresponding to the preset state B needs to be re-run, and if so, a state identifier of the programmable circuit 11 can be controlled to be re-set to the current preset state through the action 4 following the action 3, and then the action execution circuit module corresponding to the current preset state is stopped running. In this way, when the action execution circuit module corresponding to the current preset state is stopped running, according to the state identifier of the programmable circuit 11, the action execution circuit module corresponding to the current preset state is re-run, and the action 2 is executed again.

In the embodiments of the present disclosure, when the target memory 2 is the SSD, there can be also only two cases set in the preset state B that the action execution circuit module corresponding to the preset state B is stopped running, one of which is to run the action execution circuit module corresponding to the next preset state (the preset state D), and the other is to return to the action execution circuit module corresponding to the previous preset state (preset state A).

In another embodiment, there also may be the default state (such as an initial state) in the plurality of preset states, and the actions corresponding to the one or more preset states for stopping running the action execution circuit module corresponding to the current preset state can be used to control the programmable circuit 11 to run the default state. If trigger conditions that comply with other preset states are not detected, the default state is kept.

When the target memory 2 is the SSD and the memory controller 1 is the SSD controller, the types of the actions corresponding to the plurality of preset states may include, for example: setting the target memory to run or exit a reset state, enabling or disabling a clock of the target memory, enabling or disabling isolation control of the target memory, enabling a retention flip-flop save function or a retention flip-flop restore function of the target memory, turning on or off an internal power switch of the target memory, and turning on or off an external power switch of the target memory.

For example, the preset state can be set to correspond to one or more of the following actions:

a. Set Reset=0 (set the target memory to exit the reset state);

b. Set Reset=1 (set the target memory to run the reset state);

c. Disable Clock (disables the clock of the target memory);

d. Enable clock (enable the clock of the target memory);

e. Enable Isolation Control (enable the isolation control of the target memory);

f. Disable Isolation Control (disable the isolation control of the target memory);

g. Enable Retention Flipflop Save (enable the retention flip-flop save function of the target memory);

h. Enable Retention Flipflop Restore (enable the retention flip-flop restore function of the target memory);

i. Turn on internal power switch (turn on the internal power switch of the target memory);

j. Turn off internal power switch (turn off the internal power switch of the target memory);

k. Turn on external power switch (turn on the external power switch of the target memory); and l. Turn off external power switch (turn off the external power switch of the target memory).

The above actions are only examples, and those skilled in the art can set them according to the actual situation by themselves.

By executing one or more of the above actions, the SSD can be controlled to run in the low power mode, or exit the low power mode, a sequence, a trigger time, a time interval and a duration of each action can be accurately adjusted, and a low power strategy of the SSD can be flexibly adjusted.

Since the step S1 is executed by an independent circuit (the target event monitoring module 111), and the actions corresponding to the plurality of preset states are executed in parallel, when the action execution circuit module 113 is running, it will be affected by the target event monitoring module 111 at any time, so that a prompt response to an asynchronous event can be realized. In addition, the programmable circuit 11 can quickly switch between the action execution circuit modules corresponding to the plurality of preset states. Once the target event corresponding to the trigger condition of the preset state occurs, each action can also be quickly executed, thereby making the SSD run or stop running the low power mode with a relatively low latency.

To sum up, the embodiments of the present disclosure can implement a safe, reliable, flexible and high-performance SSD low power mode control scheme, taking into account safety, reliability, flexibility, and low latency.

Corresponding to the above method embodiments, the present disclosure further provides a memory control device (a virtual device), which can be configured to execute the above method embodiments.

It should be noted that although several modules or units of the device that are configured to execute actions are mentioned in the above detailed description, such division of modules or units is not mandatory. In fact, features and functions of two or more of the modules or units described above may be embodied in one module or unit in accordance with the embodiments of the present disclosure. Conversely, the features and functions of one module or unit described above may be further divided to be embodied by multiple modules or units.

In the embodiments of the present disclosure, there is further provided an electronic device capable of implementing the above method.

Those skilled in the art can understand that various aspects of the present disclosure may be implemented as systems, methods, or program products. Therefore, various aspects of the present disclosure may be embodied as the following forms, that is, complete hardware embodiments, complete software embodiments (including firmware, microcode, etc.), or embodiments with hardware and software combined, which may be collectively referred to as "circuits", "modules" or "systems" here.

An electronic device 500 according to an embodiment of the present disclosure is described below with reference to FIG. 5. The electronic device 500 shown in FIG. 5 is only an example and shall not impose any restrictions on functions and application scopes of the embodiments of the present disclosure.

Figure 5:
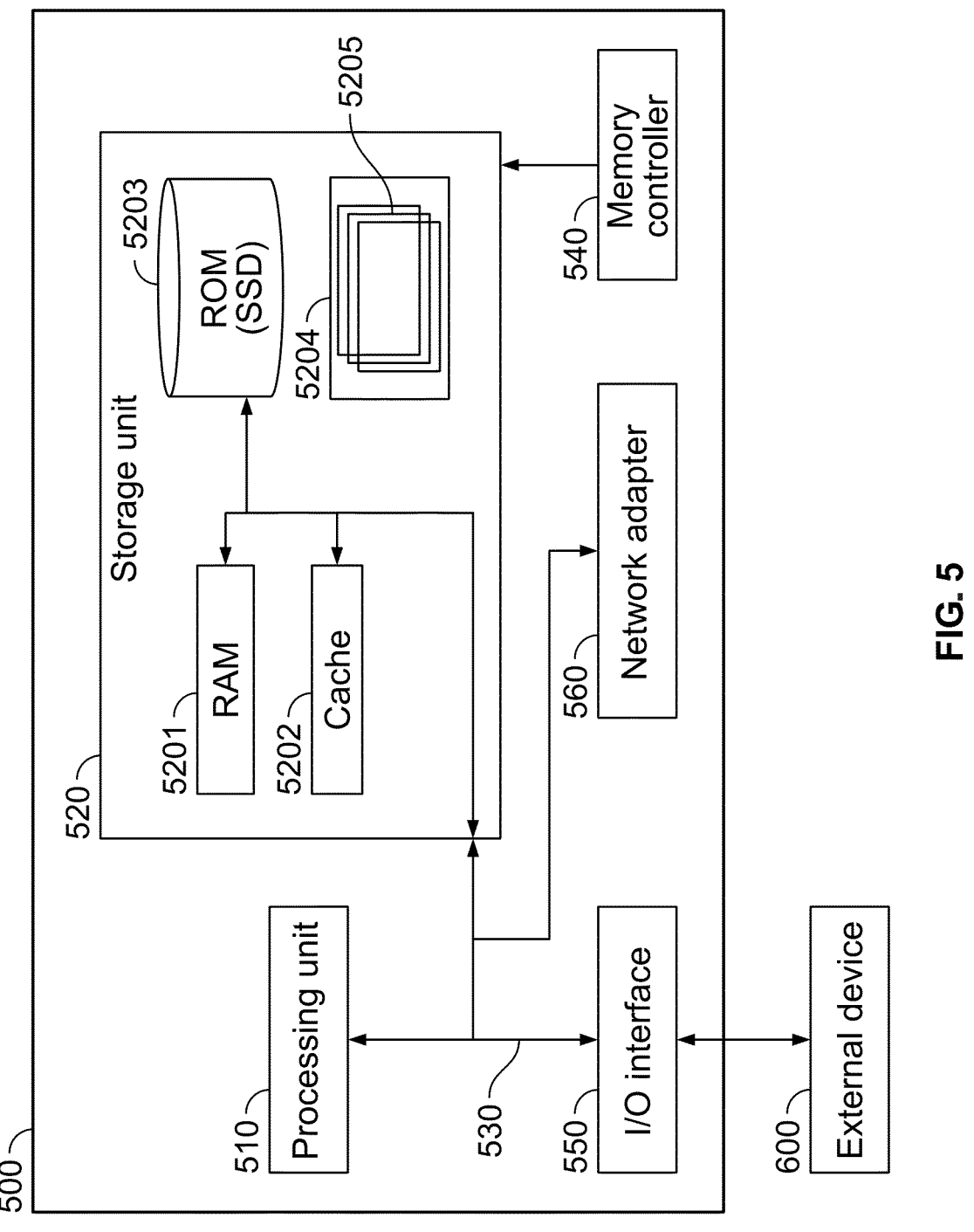
FIG. 5 is a block diagram of an electronic device according to an embodiment of the present disclosure.

As shown in FIG. 5, the electronic device 500 is represented in the form of a general-purpose computing device. Components of the electronic device 500 may include, but are not limited to, at least one processing unit 510, at least one storage unit 520, a bus 530 connecting different system components (including the storage unit 520 and the processing unit 510), and a memory controller 540.

The storage unit is stored with program codes which, when executed by the processing unit 510, can cause the processing unit 510 to execute steps according to various embodiments of the present disclosure described in the "exemplary method" described above in the specification. For example, the processing unit 510 may execute the method exemplified in the embodiments of the present disclosure.

The storage unit 520 may include a readable medium in the form of volatile storage unit, such as a Random Access Memory (RAM) 5201 and/or a cache storage unit 5202, and it may further include a Read-Only Memory (ROM) or a Solid State Drive (SSD) 5203.

The storage unit 520 may also include a program/utility tool 5204 having a set of (at least one) program module 5205. Such program module 5205 includes, but is not limited to, an operating system, one or more applications, other program modules and program data, each or a combination of the examples may include the implementation of a network environment.

The bus 530 may be one or more of several types of bus structures, including a storage unit bus or a storage unit controller, a peripheral bus, an accelerated graphics port, a processing unit, or a local bus using any of the various bus structures.

The memory controller 540 is, for example, the memory controller 1, which is configured to implement the method of any of the above embodiments to control the storage unit 520.

The electronic device 500 may also communicate with one or more external devices 600 (e.g., a keyboard, a pointing device, a Bluetooth device), or may communicate with one or more devices that enable the user to interact with the electronic device 500, and/or communicate with any device (e.g., a router, a modem, etc.) that enables the electronic device 500 to communicate with one or more other computing devices. The communication may be carried out through an input/output (I/O) interface 550. Moreover, the electronic device 500 may also communicate with one or more networks (such as a Local Area Network (LAN), a Wide Area Network (WAN) and/or a public network, e.g. Internet) via a network adapter 560. As shown, the network adapter 560 communicates with other modules of the electronic device 500 via the bus 530. It should be noted that although not shown in the figure, other hardware and/or software modules may be used in conjunction with the electronic device 500, including, but not limited to, a microcode, a device driver, a redundancy processing unit, an external disk drive array, an RAID system, a tape drive, a data backup storage system or the like.

Through the description of the above-mentioned embodiments, it is apparent for those skilled in the art to understand that the exemplary embodiments described here may be implemented by software or by software in combination with necessary hardware. Therefore, the technical solution of the embodiments of the present disclosure may be embodied in the form of a software product which may be stored in a non-volatile storage medium (which may be a CD-ROM, a USB flash disk, or a mobile hard disk) or on a network and which may include several instructions to enable a computing device (which may be a personal computer, a server, a terminal device, or a network device) to implement the method according to the embodiments of the present disclosure.

In the embodiments of the present disclosure, there is further provided an electronic device stored thereon with a program product capable of implementing the method described above in the specification. In some possible embodiments, various aspects of the present disclosure may also be implemented in the form of a program product, which includes program codes. When the program product is running on a terminal device, the program codes is configured to cause the terminal device to execute the steps according to various embodiments of the present disclosure described in the "exemplary methods" described above in the specification.

A program product for implementing the method according to an embodiment of the present disclosure may use a portable Compact Disk Read-Only Memory (CD-ROM), and include program codes, and may be running on the terminal device, such as the personal computer. However, the program product of the present disclosure is not limited to this. In this document, a readable storage medium may be any tangible medium containing or storing a program, which may be used by or used in combination with an instruction execution system, an apparatus, or a device.

The program product may adopt any combination of one or more readable mediums. The readable medium may be a readable signal medium or a readable storage medium. The readable storage medium may be, for example, but not limited to, electrical, magnetic, optical, electromagnetic, infrared, or semiconductor systems, apparatuses or devices, or any combination thereof. More specific examples (non-exhaustive list) of the readable storage medium include: electrical connections with one or more wires, a portable disk, a hard disk, a Random Access Memory (RAM), a Read-Only Memory (ROM), an Erasable Programmable Read-Only Memory (EPROM or flash), an optical fiber, a portable Compact Disk Read-Only Memory (CD-ROM), an optical storage device, a magnetic storage device, or any suitable combination thereof.

A computer-readable signal medium may include a data signal transmitted in a baseband or as part of a carrier, which carries a readable program code. The transmitted data signal may be represented in many forms, including, but not limited to, an electromagnetic signal, an optical signal, or any suitable combination thereof. The readable signal medium may also be any readable medium other than the readable storage medium, which may send, propagate, or transmit programs which are used by or used in conjunction with the instruction execution system, the apparatus, or the device.

Program codes contained on the readable medium may be transmitted with any appropriate medium, which includes, but is not limited to, wireless, wired, an optical cable, RF, etc., or any suitable combination thereof.

Program codes for performing an operation of the present disclosure may be written in any combination of one or more programming languages, which include object-oriented programming languages such as Java, C++, conventional procedural programming languages such as "C" language or similar programming languages. The program codes may be executed entirely on a user computing device, partially on a user device, as a separate software package, partially on the user computing device and partially on a remote computing device, or entirely on the remote computing device or a server. In the case where the remote computing device is involved, the remote computing device may be connected to the user computing device through any kind of network, including a Local Area Network (LAN) or a Wide Area Network (WAN), or may be connected to an external computing device (for example, connected through the internet by using an internet service provider).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory controller system associated with controlling a target solid state drive (SSD) memory, comprising:

a memory; and a processor coupled to the memory and configured to configure a programmable circuit, including by:

selecting, in a target event monitoring module in the programmable circuit, a plurality of target events to monitor in real time;

specifying, in a preset state selecting module in the programmable circuit, a logical combination of the plurality of target events that correspond to a triggered preset state in a plurality of preset states; and associating, in the preset state selecting module in the programmable circuit, a corresponding action execution circuit module, in a plurality of action execution circuit modules in the programmable circuit, with the triggered preset state, wherein after the programmable circuit is configured:

the target event monitoring module monitors the plurality of target events in real time;

the preset state selecting module selects the corresponding action execution circuit module to run in the event the triggered preset state is satisfied; and the corresponding action execution circuit module executes an action associated with one or more of the following in the event the triggered preset state is satisfied: causing the target SSD memory to enter or exit a reset state, enabling or disabling a clock of the target SSD memory, enabling or disabling isolation control of the target SSD memory, or changing a state of a power switch of the target SSD memory.

2. The memory controller system recited in claim 1, wherein changing the state of the power switch of the target SSD memory includes one or more of the following: turning on an internal power switch of the target SSD memory, turning off the internal power switch of the target SSD memory, turning on an external power switch of the target SSD memory, or turning off an external power switch of the target SSD memory.

3. The memory controller system recited in claim 1, wherein configuring the programmable circuit further includes setting a duration associated with running the corresponding action execution circuit module.

4. A method for managing a memory controller system associated with controlling a target solid state drive (SSD) memory, comprising:

selecting, in a target event monitoring module in a programmable circuit, a plurality of target events to monitor in real time;

specifying, in a preset state selecting module in the programmable circuit, a logical combination of the plurality of target events that correspond to a triggered preset state in a plurality of preset states; and associating, in the preset state selecting module in the programmable circuit, a corresponding action execution circuit module, in a plurality of action execution circuit modules in the programmable circuit, with the triggered preset state, wherein:

selecting, specifying, and associating are included in a process to configure the programmable circuit; and after the programmable circuit is configured:

the target event monitoring module monitors the plurality of target events in real time;

the preset state selecting module selects the corresponding action execution circuit module to run in the event the triggered preset state is satisfied; and the corresponding action execution circuit module executes an action associated with one or more of the following in the event the triggered preset state is satisfied: causing the target SSD memory to enter or exit a reset state, enabling or disabling a clock of the target SSD memory, enabling or disabling isolation control of the target SSD memory, or changing a state of a power switch of the target SSD memory.

5. The method recited in claim 4, wherein changing the state of the power switch of the target SSD memory includes one or more of the following: turning on an internal power switch of the target SSD memory, turning off the internal power switch of the target SSD memory, turning on an external power switch of the target SSD memory, or turning off an external power switch of the target SSD memory.

6. The method recited in claim 4, wherein configuring the programmable circuit further includes setting a duration associated with running the corresponding action execution circuit module.

* * * * *